May 23, 1967   H. B. WEBER   3,320,904
SPRING DAMPENED BOLSTER
Filed Dec. 28, 1964   2 Sheets-Sheet 1
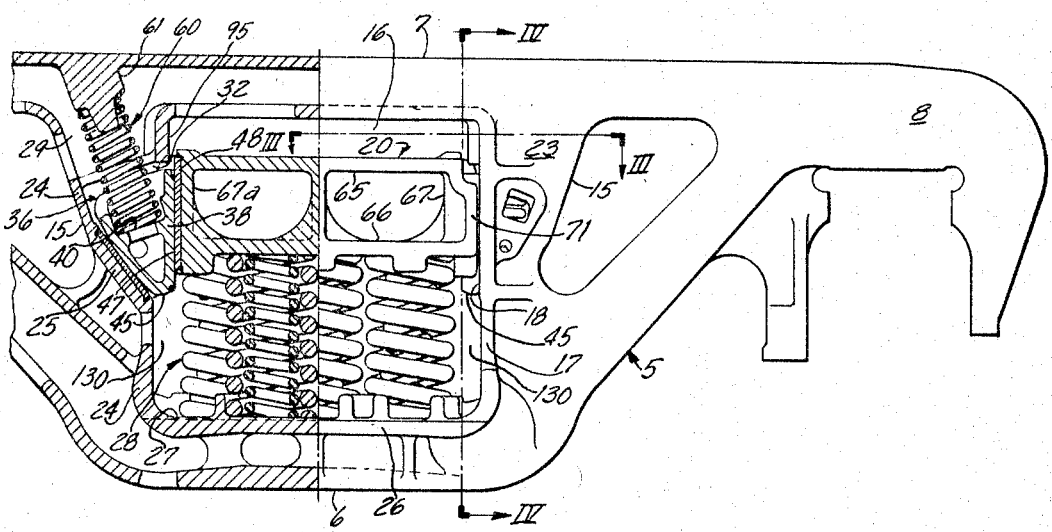
Fig.2
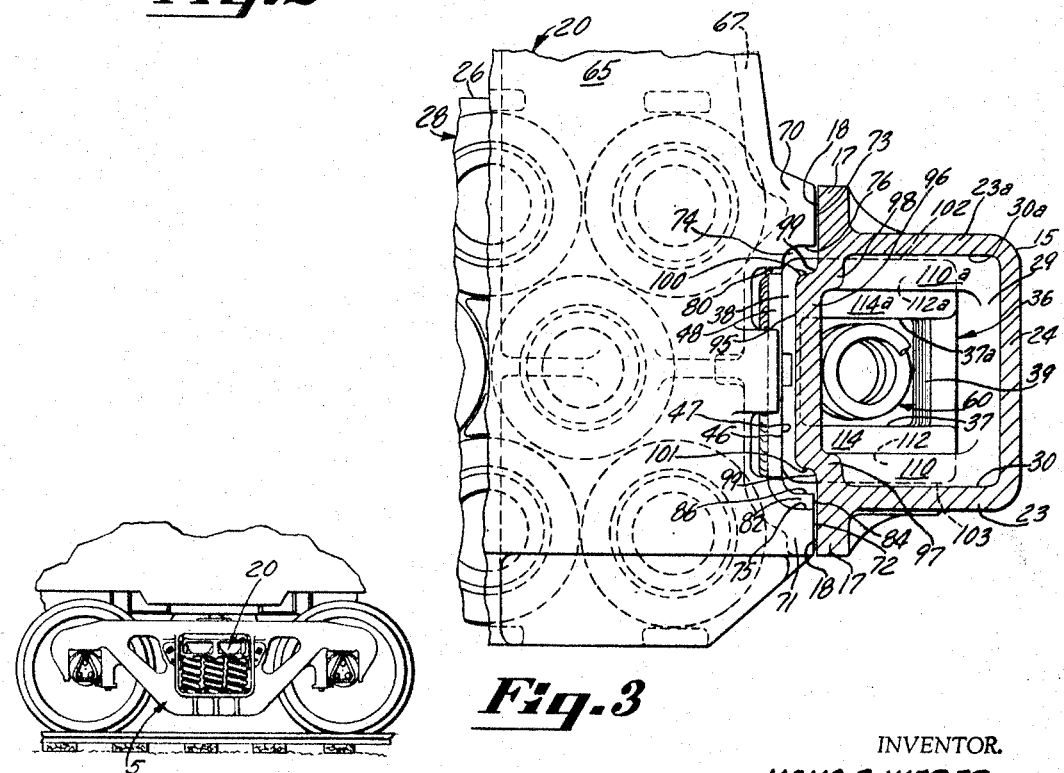
Fig.3
Fig.1
INVENTOR.
HANS B. WEBER
BY
Henry Kozak
ATTORNEY

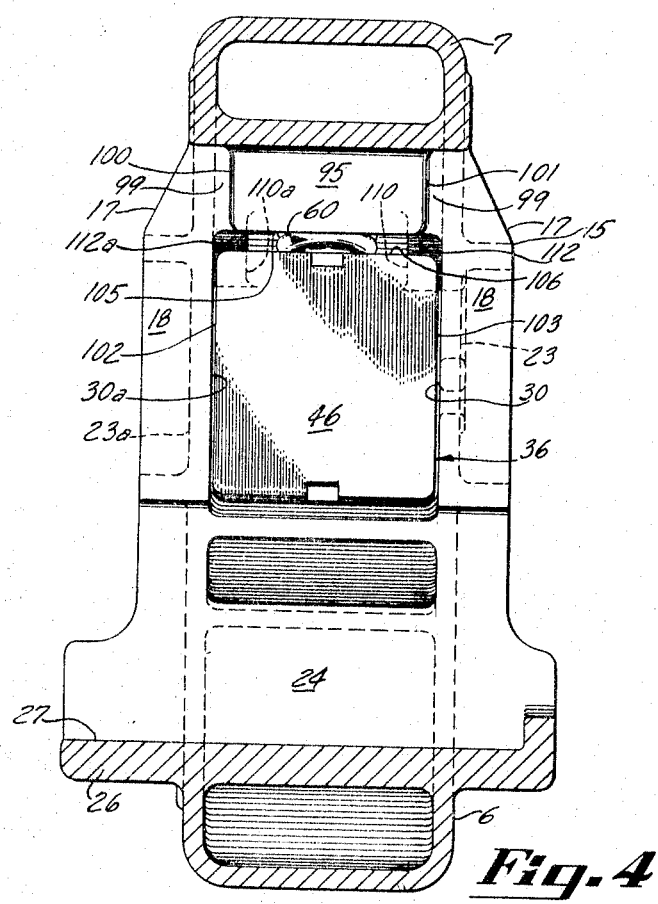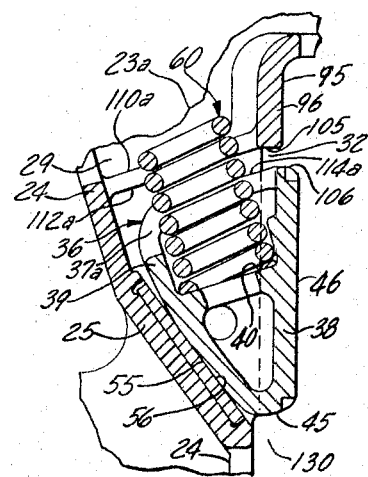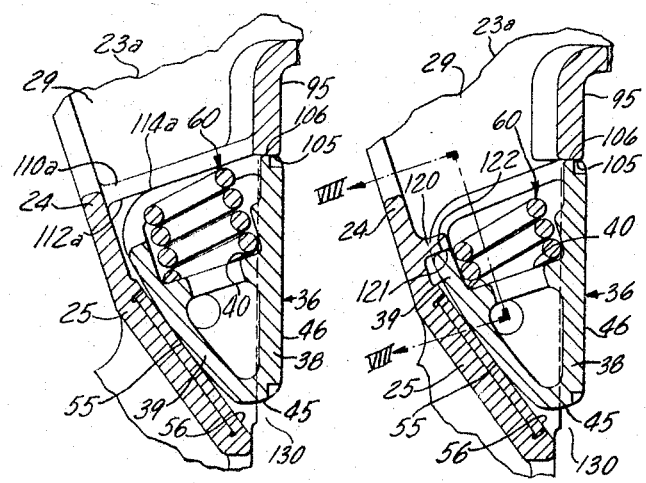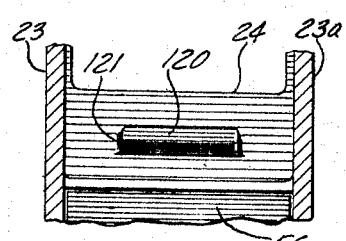

United States Patent Office 3,320,904
Patented May 23, 1967

3,320,904
SPRING DAMPENED BOLSTER
Hans B. Weber, Bedford, Ohio, assignor, by mesne assignments, to Midland-Ross Corporation, Cleveland, Ohio, a corporation of Ohio
Filed Dec. 28, 1964, Ser. No. 421,214
6 Claims. (Cl. 105—197)

This invention relates to a railway car truck having a built-in-type of friction mechanism for controlling the vertical and lateral oscillations of the bolster relative to the side frame and more particularly to a friction mechanism for interlocking the bolster and the side frame in the transverse direction of the truck.

It is now appreciated that when bolsters are interlocked with side frames in the horizontal transverse direction of a car truck, the faces of the wedge in contact with the bolster are the surfaces subjected to the greatest wear, especially if hardened wear plates are used in the recesses of the bolsters forming portions of the friction wedge pockets. Other portions of the wedge subjected to relatively high wear are lateral areas which slidably engage the side surfaces of the recesses of the bolster into which the wedges extend. These latter surfaces engage when the bolster is subjected to sufficient force directed lengthwise of itself or transversely of the car truck, or during warping motions of the truck. It is now recognized that a wedge of simple straight-sided construction, of which the width of all transversely measured portions does not exceed the transverse spacing of that portion of the pocket in the column, is a satisfactory design for maintaining a desired amount of side surface contact with the bolster. Such surface contact remains practically constant in spite of wedge wear. This is due to the fact that the wedge feeds automatically into the bolster recess as its bolster-engaging wall wears away.

However, in using this type of bolster-side frame interlock, it is desirable to have a car truck design which incorporates such other features of a car truck as (1) structural safeguards against dislodgement of the wedge out of bolster and side frame interlocking relationship under all operating conditions of the car truck, (2) simplified wedge, bolster, and side frame construction, (3) a car truck design which permits variations in magnitude of clearance permitted between the bolster and side frames, (4) strengthened side frames, and such other features as may become apparent herein.

It is therefore an important object of this invention to limit the freedom of a friction wedge in a car truck to move out of operating position, such as when a wedge spring breaks, whereby the wedge will, under emergency conditions, maintain interlocked relation of the bolster and the side frame in the transverse direction of the truck.

Another object is to provide in a car truck means which limits the movement of a friction wedge away from the normal operating position of the bolster.

A further important object is to provide a car truck which has means to prevent the tilting of the wedge within the pocket when the upper position of the wedge's range of movement has been reached.

A more specific object of this invention is to provide a car truck side frame in which each column thereof has laterally spaced side walls which are integrally joined to the compression member of the frame to reduce the span of the compression member partially forming the bolster-receiving opening.

In brief, the invention resides in a car truck of the type having friction mechanism wherein the wedges thereof are of simple flat-side construction and occupy pockets which extend partly in the side walls of the bolster and partly in the columns of each side frame to cause the wedges to interlock the bolster with the side frames in the transverse horizontal direction of the truck. In providing such pockets, each wedge is flanked by vertically elongate lugs of the bolster, and portions of the adjacent column of substantially greater vertical length than the lugs and in opposition with the lugs at small clearance to limit the parallelogramming of the truck. The spacing of the lugs is about equal to, or slightly greater than, that of the column portions.

An important feature of the invention is that each column includes a detent means or bridging element joining and extending between the separated portions of a column, but arched outwardly into the bolster opening to overhang the recess in the bolster and provide a part of the wedge pocket at a desired spacing above the wedge.

In addition, the side frame provides one or more additional abutments at the top of the pocket in the form of lugs, ridges, or ribs associated with the side walls or a rear inclined wall of the pocket. These cooperate with the bridging element as stop means for positively confining the wedge within the bolster portion as well as the side frame portion of the pocket. Their primary function, however, is to prevent the wedge from tilting within the pocket when the wedge is disposed in its uppermost position.

In the drawings, with respect to which the invention is described below:

FIG. 1 is a side elevation of the car truck in accordance with the invention as mounted on a railway car;

FIG. 2 is an enlarged fragmentary side elevation, partially in section, of the side frame and bolster of the car truck illustrated in FIG. 1;

FIG. 3 is an enlarged fragmentary plan view in transverse section taken along line III—III of the side frame and bolster illustrated in FIG. 2;

FIG. 4 is an enlarged elevation view in transverse section taken along line IV—IV of the side frame illustrated in FIG. 2;

FIG. 5 is an enlarged fragmentary side elevation in section showing the friction wedge in the side frame column as in the left side of FIG. 2;

FIG. 6 is a view similar to FIG. 5 illustrating the position of the wedge in its upper retracted position;

FIG. 7 is a view similar to FIG. 6 but showing another embodiment of the invention; and FIG. 8 is a fragmentary view in section taken along line VIII—VIII of FIG. 7.

Referring to FIG. 2 of the drawings, a fragmentary view of a snubbed railway car truck is illustrated. The truck comprises a side frame 5 having vertically spaced tension and compression members 6 and 7, respectively. The members merge towards the ends of the frame and are joined to a depending jaw pedestal 8 for receiving an axle box which houses an associated tapered roller bearing and wheel-axle assembly (not shown).

The side frame includes a pair of longitudinally spaced vertical guide columns 15, 15 disposed intermediately along the length of the frame 5. The columns integrally connect the members 6 and 7 to define a generally rectangular bolster-receiving opening 16. The opening 16 receives one end of a bolster 20 that is arranged with its longitudinal axis transverse to the length of the frame 5. It will be understood that another side frame cooperates with the opposite end of the bolster in like manner and is therefore not necessary to an understanding of the invention.

Each column 15 comprises, in equi-distant relation from the longitudinal axis of the side frame, an outboard side wall 23 and an inboard side wall 23a. Walls 23 and 23a are joined by a transverse wall 24. The lower end of wall 24 extends vertically upward from the tension member 6 and defines the lower boundary of the bolster-receiving opening 16. Intermediate the height of the side walls, wall 24 bends diagonally outwardly between the side walls 23, 23a to form a wedge bearing portion 25.

Each side wall adjacent to the bolster-receiving opening 16 has a vertically elongate flange 17 that projects laterally outwardly therefrom. Each flange 17 in conjunction with each side wall provides a substantially planate column guide surface 18 that faces the bolster 20. As illustrated in FIGURES 2 and 3, the laterally spaced surfaces 18, 18 of the columns are disposed approximately within a transverse vertical plane to provide two relatively large co-planar bearing or wear surfaces.

The mid-portion of tension member 6, in its lengthwise direction, includes a widened central portion 26 that provides a spring seat 27 for the accommodation of a spring group 28. The spring group resiliently supports an end of the bolster 20 in the upper portion of the opening 16, the bolster end being movably associated with the guide columns 15, 15.

To cushion or dampen the vertical and lateral oscillations of the bolster 20, a friction mechanism is provided as shown herein. Portions of the mechanism are housed within a pocket 29 defined by inner surfaces 30, 30a of the side walls 23, 23a and the inclined portion 25 of wall 24. Pocket 29 communicates with bolster opening 16 through an opening 32 provided in each column 15, 15. Within pocket 29 is a hollow friction wedge 36 that is generally triangular in shape. The wedge has a pair of laterally spaced side wall members 37, 37a and a front vertical wall 38 that engages the bolster. The wedge also has a sloping rear wall 39 which is crowned or curved in a vertical direction and a spring seat 40 disposed between, and joining members 37, 37a and walls 38, 39. The front and rear walls are relatively divergent and join in a wedge tip 45. A vertical bolster-engaging surface 46 is provided on the front wall 38 for engaging, in slidable frictional relationship, a vertical wear face 47 on a wear plate 48 which is structurally associated with the bolster 20. The wear plate 48 is of L-shaped horizontal cross section. A downwardly facing surface 55 is provided on the sloping rear wall 39 of the wedge for engagement in rockable relation with an upwardly-facing wear surface 56 on the wedge bearing portion 25 of wall 24. The wedge is urged into engagement with the opposing bolster wear plate 48 and the bearing portion 25 of pocket 29 by a spring 60 that is under predetermined compression between the seat 40 on the wedge and a spring seat 61 disposed on the compression member 7.

The bolster 20 is of box section and comprises a top wall 65, a bottom wall 66 and side walls 67 and 67a. On each of the opposite side walls of the bolster there is a pair of horizontally spaced and vertically elongate guide lugs 70, 71. These lugs are primarily intended to retain the end of the bolster within the bolster-receiving opening 16 when interlocked therewith by the wedge 36. Thus, lugs 70 and 71 overlap the wedge in a direction longitudinally of the side frame.

Each lug 70 and 71 is provided with a guide face 72 or 73. Faces 72 and 73 are in a common vertical plane parallel to the lengthwise direction of the bolster 20 and are in spaced opposed relation with the respective guide surfaces 18, 18 of the flanges 17, 17. Lug 71 presents a guide face 72 having a shorter lateral extent than the face 73 of lug 70. These faces are adapted to engage the guide surfaces 18, 18 in guided cooperating relation.

Disposed between each pair of lugs 70, 71 there is a vertically elongated U-shaped recess 74 which is horizontally recessed from the plane containing the guide faces 72 and 73. Recess 74 is defined primarily by the bolster wear plate 48 and is adapted to receive that portion of the associated wedge which includes the wedge tip 45 and the front wall 38. In addition, recess 74 defines a pair of opposed, inwardly facing vertical surfaces 75 and 76, of which surface 75 is spaced further from the longitudinal axis of the side frame than surface 76. These surfaces are in spaced juxtaposed relation to the portion of the side wall members 37, 37a immediately joining the front vertical wall 38 of the wedge.

Each bolster side wall 67 and 67a provides a vertically extending cavity 80 opposite the opening 32 intermediately of the lugs 70 and 71 for receiving the wear plate 48. The wear plate, being L-shaped, has a curvate lip 82 formed on one end thereof which is adapted to seat against the vertical surface 75. The lip extends away from the bolster axis a predetermined distance and provides a vertical end face 84 that is disposed within the vertical plane of face 72 to form, in combination with face 72, an overall guiding face on the outboard side of the side frame equal in lateral extent to face 73. Such structure provides maximum surface area contact between the bolster and side frame; which, in effect, promotes longer side frame life by decreasing the abrasive wearing action therebetween. The lip 82 has a planate guide surface 86 which faces inwardly of the truck toward lug 70. Surface 86 is in opposed-spaced relation with a portion of an end surface of the wedge disposed within the recess 74 to engage therewith, if necessary, to limit the lateral movement of the bolster relative to the side frame.

As an important feature of this invention, the side frame includes a detent means or bridging element 95 disposed within the bolster-receiving opening 16 and immediately adjacent the compression member 7. The element structurally joins the side walls 23, 23a and merges at its upper end with the compression member 7. Element 95 comprises, in horizontal section, a U-shaped member 96 that has outwardly curvate legs forming laterally extending ribs 97 and 98 that merge with the opposed lateral facing side surfaces 30 and 30a of the column. Each rib in cooperation with each side wall provides a longitudinally facing vertical area 99 that lies within the plane containing the guide surfaces 18, 18. Such structure permits normal lateral bolster movement within the side frame bolster opening when the bolster is disposed in its normal operating position.

The U-shaped member 96 projects in the longitudinal direction of the side frame outwardly from the column and the region between the side walls 23 and 23a into the bolster-receiving opening 16 a predetermined distance; and to an extent less than the depth of the U-shaped recess 74 provided on the bolster. Adjoining the area 99 of each rib, member 96 defines outer-transversely facing surfaces 100 and 101, respectively. The horizontal spacing between surfaces 100 and 101 is less than the outer transverse dimension of the wedge measured between outer vertical surfaces 102 and 103 on side members 37 and 37a. Thus, element 95 overhangs, in spaced vertical relation, that portion of the wedge disposed within the bolster-receiving opening 16. Such structure permits normal vertical movement of the bolster to an upper position within the bolster opening, such as is necessary for load spring removal. In addition, the element 95 reduces the span of the compression member 7 over the bolster-receiving opening 16. This, in effect, strengthens the frame in that the compression member 7 has a greater resistance to column buckling.

As illustrated in FIGURES 5 and 6, element 95 has a downwardly-facing surface 105 that is adapted to engage an upwardly-facing surface 106 disposed on the front wall 38 of wedge 36. Such engagement provides one extremity of a range of movement of the wedge. Thus, the wedge has an overall range of movement that extends between the normal position of the wedge within the pocket and recess and the upper position of the wedge that is defined by the engagement of the above-identified surfaces.

To supplement the element 95 in preventing accidental withdrawal of the wedge from the bolster-receiving opening 16, there is disposed within each pocket 29 a pair of opposed side wall ribs 110, 110a. Each rib projects inwardly, from its associated side wall, an extent approximately equal to the transverse dimension of the curvate leg of bridging element 95. Each side wall rib merges at its ends with the lower end of element 95 and the rear sloping wall 24 of column 15. The ribs have respective downwardly-facing areas 112, 112a which are engageable with a pair of upwardly-facing surfaces 114, 114a, disposed on the respective side members 37, 37a of the wedge. The downwardly-facing areas 112, 112a are located in a general transverse plane that slopes downwardly and away from the element 95. Such rib structure or stop means cooperates with the element 95 to prevent the tilting of the wedge 36 within the pocket. Thus, wedge stability is maintained at the upper position of the wedge's range of movement. In addition, the ribs reinforce the wedge pocket to further stiffen the side walls of the column. This strengthens the side frame, and especially the column, against deflection.

FIGURES 7 and 8 illustrate a single rib or stop means 120 within the pocket 29 for maintaining wedge stability and which further supplements the bridging element 95 in limiting the upward movement of the wedge 36. The rib 120 projects inwardly from the sloping wall 24 centrally of the pocket. This rib extends transversely of the column a distance less than that between the side members 23, 23a and has a downwardly-facing area 121 engageable with an upwardly facing surface 122 on the rear wall 39 of the wedge.

As shown in FIGURES 2, 3 and 5, the wedge 36 is urged by the spring 60 downwardly against the surfaces 47 and 56, this being the normal operative position of the wedge within the pocket of the frame and the U-shaped recess of the bolster. In normal vertical movements of the bolster, the wedge remains seated in the lower part of its pocket. In an abnormal upward and longitudinal movement of the bolster relative to the side frame, the wedge may be forced inwardly and upwardly until the wedge engages the safety structure, i.e., the element 95 and the ribs 110, 110a or the rib 120, which limits the upward movement.

In the assembly or disassembly of the side frame and bolster, conventional means are provided for urging the wedge of each column into its respective pocket out of frictional engagement with the bolster wear plate somewhat as described in United States Patent No. 2,712,796. However, it is to be noted that the wedge described in the present invention has less freedom of movement in the general longitudinal direction of the side frame than that disclosed in the above prior art device. That is, in the fully retracted pinned position of the wedge, a portion of the wedge comprising the wedge tip 45 and front wall 38 remains, as mentioned hereinabove, within the bolster opening of the frame defined by the opposed peripheral surfaces of the columns 15, 15. Thus, each wedge tip 45 overhangs a lower portion of the column 15 to define in combination therewith an enlarged bolster-entry portion 130 of the bolster opening 16 for receiving the end portion of the bolster during the assembly of the car truck. Hence, once the recess 74 and guide lugs 70 and 71 of the bolster 20 are aligned with the opening 16 relative to the retracted wedge, the boster is raised upwardly to allow the assembly and placement of the spring group 28. Thereafter the conventional pins that are used to maintain the wedges in a retracted position are removed to permit the wedges to engage the recessed wear surfaces on the bolster. In this position the bolster lugs flank the wedge 36, thereby restricting the lateral movement of the bolster 20 relative to the side frame 5.

In view of the above, it can easily be seen that the bolster may be moved freely into and out of the side frame when disposed within the enlarged bolster-entry portion 130 of the bolster opening 16. When the bolster is disposed in its normal operating position, lateral movement of the bolster relative to the length of the side frame is limited by the engagement of vertical surfaces 76 and 86 with the wall members 37 and 37a of the wedge, which members provide a constant lateral area contact with the vertical surfaces in spite of wedge wear. Upward movement of the bolster is limited by the compression member 7 while downward movement of the bolster is limited to the solid spring height of the bolster springs 28. Movement of the bolster in the lengthwise direction of side frame is limited by the snubbing-action of the friction wedge and positively limited in such movement when the guide faces 72, 73 and 84 engage the guiding surfaces 18, 18 of the flanges. Thus, complete interlocking of the bolster and the side frame by the wedge is achieved.

The terms and expressions which have been employed are used as terms of description and not of limitation and there is no intention of excluding such equivalents of the invention described or portions thereof as fall within the scope of the claims.

What is claimed is:
1. In a railway car truck:
(A) a side frame and a bolster, said frame having a compression member and a tension member joined by a pair of spaced vertical columns defining therebetween a bolster-receiving opening, said bolster having an end portion disposed within said opening for guided vertical movement with respect to the side frame, and each column having a pair of side walls spaced transversely relative to the length of the side frame and a rear wall between the side walls sloping away from said opening and defining a pocket for receiving a friction wedge;
(B) a wedge disposed within each of said pockets comprising a pair of transversely spaced side members united by a rear inclined wall and a front vertical wall, said inclined wall having a surface engaging in rockable relation said rear sloping wall, and said front wall having a vertical surface in frictional engagement with an opposing wear face of the bolster, said vertical surface having a transverse dimension substantially equal to the distance between the outer surfaces of said side members, said wear face being horizontally recessed to dispose a portion of said wedge within said opening, said bolster having a pair of guide means flanking said portion of the wedge thereby enabling said wedge to interlock said frame and bolster and limit relative displacement of the bolster transversely of said frame;
(C) spring means urging said wedge into engagement with said wear face and the rear wall;
(D) detent means on each of said columns projecting into said opening to limit both retraction and vertical movement of said wedge relative to said face a predetermined amount and to define the upper limit of a range of movement of the wedge away from said wear face within said opening to maintain said interlocking relationship between said guide means and wedge portion; and
(E) stop means within said pocket adapted to engage the wedge at said upper limit to prevent the tilting of the wedge within the pocket.

2. The railway car truck of claim 1 wherein:
said detent means comprises a bridging element immediately adjacent to said compression member joining with said side walls and projecting into the bolster opening in vertically-spaced opposed relation to said wedge portion, said element merging at its upper end with said compression member and said element having a downwardly facing surface adapted to engage said wedge portion.

3. The railway car truck of claim 2 wherein:
said stop means comprises a pair of oppositely facing wedge engaging ribs, each rib projecting inwardly from one of the side walls into said pocket and merging, at its ends, with said sloping wall and the lower portion of said bridging element.

4. The railway car truck of claim 1 wherein:
said stop means comprises a centrally disposed wedge engaging rib which projects inwardly from said sloping wall into said pocket.

5. The railway car truck of claim 4 wherein:
said rib has a dimension transversely of said length less than the distance between said side members.

6. In a railway car truck:
(A) a side frame and a bolster, said frame having a compression member and a tension member joined by a pair of spaced vertical columns defining therebetween a bolster-receiving opening, said bolster saving an end portion disposed within said opening for guided vertical movement with respect to the side frame, and each column having a pair of side walls spaced transversely relative to the length of the side frame and a rear wall between the side walls sloping upwardly and away from said opening and defining a pocket for receiving a friction wedge;
(B) a wedge disposed within each of said pockets comprising a pair of transversely spaced side members united by a rear inclined wall and a front vertical wall, said inclined wall having a surface engaging said rear sloping wall, and said front wall having a vertical surface in frictional engagement with an opposing wear face of the bolster, said vertical surface having a transverse dimension substantially equal to the distance between the outer surfaces of said side members, said wear face being horizontally recessed to dispose a portion of said wedge within said opening, said bolster having a pair of guide lugs flanking said portion of the wedge thereby enabling said wedge to interlock said frame and bolster and limit relative displacement of the bolster transversely of said frame;
(C) spring means urging said wedge downwardly into engagement with said wear face and the rear wall;
(D) detent means on each of said columns projecting into said opening to limit both retraction and vertical movement of said wedge away from said face a predetermined amount and to define the upper limit of a range of movement of the wedge away from said wear face within said opening to maintain said interlocking relationship between said guide means and wedge portions; and
  (1) said detent means comprising a bridging element immediately adjacent to said compression member joining with said side walls and projecting into the bolster-receiving opening in vertically-spaced opposed relation to said wedge portion, said element having a downwardly facing surface adapted to engage said wedge portion, said element merging at its upper end with said compression member and the transverse dimension between the opposed inner surfaces of said side walls being greater than the distance between outer transversely facing surfaces of said element disposed in said bolster opening.

References Cited by the Examiner
UNITED STATES PATENTS

| | | | |
|---|---|---|---|
| 2,159,138 | 5/1939 | Duryea | 105—197 |
| 2,324,267 | 7/1943 | Oelkers | 105—197 |
| 2,352,693 | 7/1944 | Davidson | 105—197 |
| 2,368,856 | 2/1945 | Light | 105—197 |
| 2,626,572 | 7/1953 | Orr | 105—197 |
| 2,697,406 | 12/1954 | Heater et al. | 105—197 |
| 2,697,989 | 12/1954 | Shafer | 105—197 |
| 2,723,360 | 11/1955 | Settles | 105—197 |

ARTHUR L. LA POINT, *Primary Examiner.*

H. BELTRAN, *Assistant Examiner.*